United States Patent [19]

Moore et al.

[11] Patent Number: 4,697,243
[45] Date of Patent: Sep. 29, 1987

[54] METHODS OF SERVICING AN ELEVATOR SYSTEM

[75] Inventors: William H. Moore, Bridgewater; Charles M. Gutowski, Paramus, both of N.J.; William J. Trosky, Wilkinsburg; Thomas A. Butler, Pittsburgh, both of Pa.

[73] Assignee: Westinghouse Electric Corp., Pittsburgh, Pa.

[21] Appl. No.: 758,984

[22] Filed: Jul. 25, 1985

[51] Int. Cl.⁴ .............. G06F 11/00; B66B 3/00
[52] U.S. Cl. ............... 364/513; 364/184; 364/900; 187/133; 340/825.34; 178/4.1 B; 178/22.08; 379/95; 380/25
[58] Field of Search ........... 364/513, 200, 900, 184; 340/825.3, 825.34, 19 R; 187/29 R; 178/4.1 B, 22.01, 22.08; 179/1.5 R, 2 DP, 18 D, 2 CA

[56] References Cited

U.S. PATENT DOCUMENTS

| | | | |
|---|---|---|---|
| 3,976,840 | 8/1976 | Cleveland et al. | 364/900 |
| 3,984,637 | 10/1976 | Caudill et al. | 340/825.34 |
| 4,106,593 | 8/1978 | Otto et al. | 340/19 R |
| 4,154,988 | 5/1979 | Fechalos et al. | 179/18 D |
| 4,310,720 | 6/1982 | Check, Jr. | 364/900 |
| 4,330,838 | 5/1982 | Yoneda et al. | 187/29 R |
| 4,430,728 | 2/1984 | Beitel et al. | 364/900 |
| 4,512,442 | 4/1985 | Moore et al. | 340/19 R |
| 4,520,233 | 5/1985 | Smith | 178/22.08 |
| 4,531,023 | 7/1985 | Levine | 178/22.08 |
| 4,561,093 | 12/1985 | Doane et al. | 371/20 |
| 4,568,909 | 2/1986 | Whynacht | 340/19 R |
| 4,591,983 | 5/1986 | Bennett et al. | 364/478 |
| 4,593,367 | 6/1986 | Slack et al. | 364/513 |
| 4,649,515 | 3/1987 | Thompson et al. | 364/900 |

Primary Examiner—Jerry Smith
Assistant Examiner—John R. Lastova
Attorney, Agent, or Firm—D. R. Lackey

[57] ABSTRACT

A method of integrating an expert system having a knowledge base of elevator trouble-shooting information into the working environment of elevator service personnel, without special training of such personnel, and without compromising the security of the knowledge base. The method includes an interactive initialization procedure which includes successive, successful user and knowledge base initiated communication links between the user and knowledge base, before actual access to the knowledge base is permitted.

7 Claims, 13 Drawing Figures

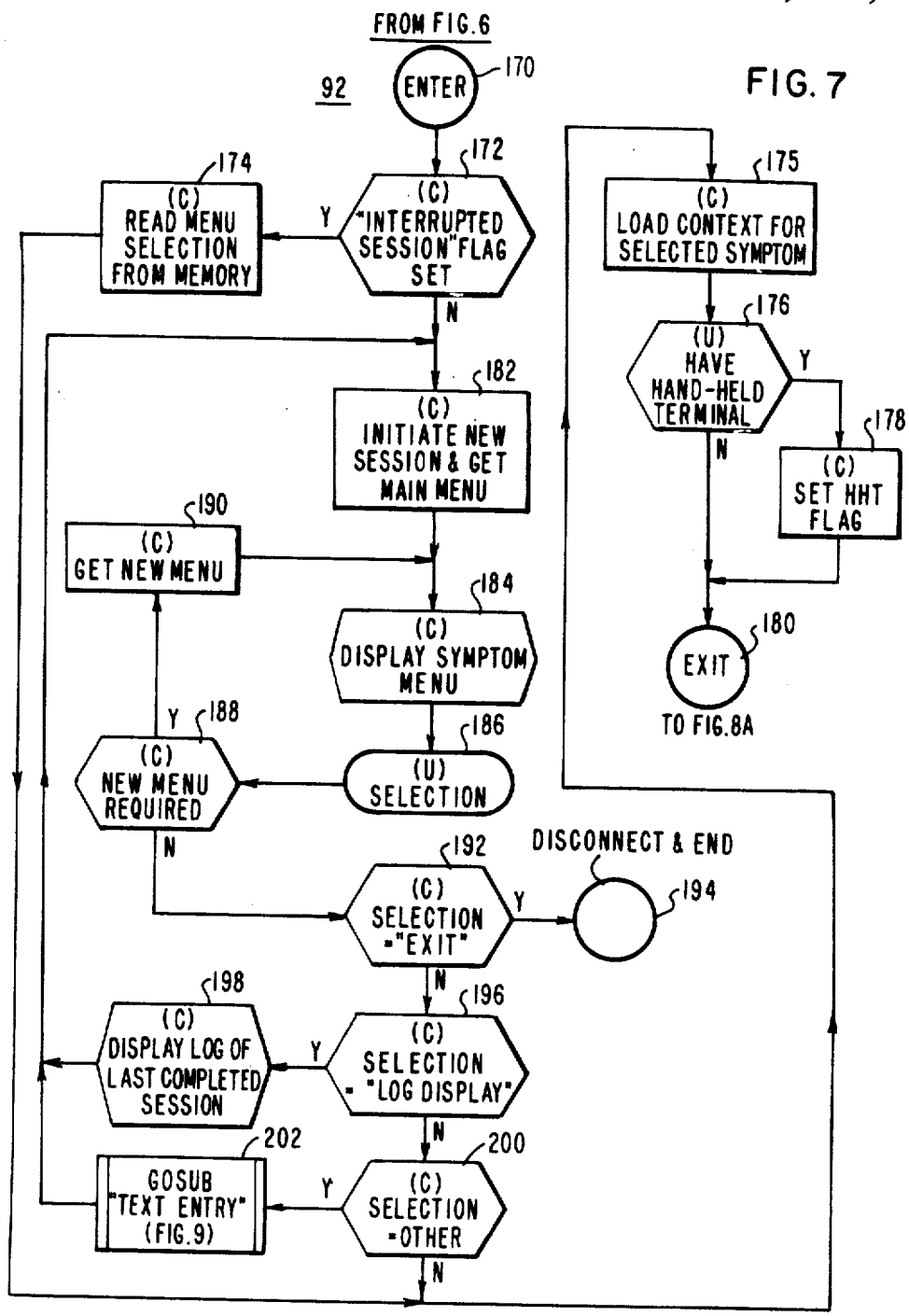

METHODS OF SERVICING AN ELEVATOR SYSTEM

BACKGROUND OF THE INVENTION

1. Field of the Invention

The invention relates in general to new and improved methods of servicing an elevator system, and more specifically to new and improved methods of integrating an expert system having a knowledge base of elevator trouble-shooting information into the working environment.

2. Description of the Prior Art

U.S. Pat. No. 4,649,515, entitled "Methods and Apparatus for System Diagnosis and Control", sets forth an expert system which may be provided with a knowledge base suitable for diagnosing problems in an elevator system.

It would be desirable to be able to use an expert system as an inanimate consultant in the servicing of elevators, because elevator systems are very complex and time consuming to trouble shoot. Elevator service personnel must be given extensive and costly training, and their effectiveness varies with ability and experience. An expert system would provide the equivalent of the most able, most experienced service person as an immediately available consultant, whose expertise would not be lost by retirement. On the contrary, the knowledge base would be constantly improved by taking advantage of the abilities and experiences of a large number of skilled elevator service personnel who, through a knowledge engineer, would add to and/or modify the domain dependent rule base.

For many reasons, it is important that the computer which runs the inference engine of the expert system, and the domain dependent rule base, be located in a centralized location. Security of the system is an important reason. It is also important because the centralized location may be used as a data gathering point for collecting and consolidating all elevator service field data which a knowledge engineer may study and use to add to and modify the rule base, as required, in order to improve the diagnostic ability of the expert system. Also, the centralized rule base would not be susceptible to a number of different people making uncoordinated changes. Further, a change made to a centralized rule base would be immediately available to all field service personnel.

Providing a plurality of expert systems for use by field service personnel would also not be desirable because such individual systems would be costly, bulky, and inconvenient to use, and it would require extensive training of high security personnel.

The problem then is how to efficiently integrate a centralized expert system into the every day working environment of an elevator service technician, which will easily handle: (a) the inexperience of such personnel with expert systems, (b) the mistakes in inputting data required by the expert system in order to select and test the rules of the knowledge base, and (c) the interruptions which will occur in the communication between the field personnel and centralized location of the expert system. Further, the expert system must be easy to use without extensive, special training, so that field service personnel will want to make use of the expert system.

SUMMARY OF THE INVENTION

Briefly, the new and improved methods of using an expert system eliminate the need for a highly skilled person to act as an intermediary between field personnel and the centralized computer based expert system. Communications are conducted directly between the elevator service technician and the central computer which runs the inference engine of the expert system, which in turn traverses the knowledge base network of domain dependent elevator service rules to create and propagate belief in a possible cause. The possibility of unauthorized access to the knowledge base of the expert system is minimized by a method in which the elevator service technician establishes the initial contact with the central computer, and he enters a personal code known only to himself, such as his social security number. If the personal code matches the code of an authorized user, the central computer asks the user for the building code which has been assigned to the building in which the elevator to be serviced is located. Once the building code is entered, the central computer breaks the user initiated communication link. If the building code is an authorized code, the central computer, using the authorized building code, obtains the information necessary to establish a computer initiated communication link with the building in question. For example, it may use the building code to determine the telephone number of the elevator machine room of the associated building. Thus, it is now known that the computer will be connected to a predetermined authorized telephone located in a secure location under the jurisdiction of authorized personnel.

Ease of operation is achieved by a terminal having a keyboard and a display. The terminal may be portable, or in the case of a large elevator installation, it may be fixed at the installation site. The central computer leads the service technician through the diagnostic session with menus, questions, and directions set forth on the display. The central computer records each session such that interruptions in the communication may be accommodated without requiring the service technician to re-input previously input evidence or data. The computer records the time the data is input, and before it is used the age of the data is computed and compared with a predetermined maximum time value. The computer asks the user if he wants to input new data when the age exceeds the maximum value.

In some instances, the service technician or user will have access to the memory of a solid state or computer operated elevator system, such as via a special terminal. The special terminal may be a portable, plug-in terminal, or a permanent terminal installed at the elevator site. In this situation, the central computer provides the user with the code that should be entered into the special terminal, in order to obtain a block of data, certain of which is required by the central computer. The block of data, for example, may be in the form of a two digit hex number containing eight bits of information. The user then inputs the two digit hex number into the local terminal for communication to the central computer. Subsequently, the age of this data is also computed before use.

Sensor data input by the user is checked for range. If it is outside a predetermined range for this sensor, which would question the validity of the data, the user is asked to re-input the data, in order to catch reading errors, keying errors, or errors in transmission. An input error recognized by the user is accommodated simply by the user actuating a predetermined key, such as a control "E", which selects an error routine. The error routine steps back through the questions and answers of the instant session, starting with the most recent question and answer, giving the user the opportunity to correct each answer. When the correction is made, actuating a control "E" again terminates the error routine. The inference engine is re-run, using the revised data.

If the expert system fails to list the malfunction symptom which the service technician has identified as being a problem in the elevator system, or if the expert system fails to accurately diagnose the problem of an identified symptom, the user enters this new symptom, the cause of the symptom or malfunction and the troubleshooting steps which the user utilized in order to identify the malfunction cause and to solve the problem. This information may be used by a knowledge engineer to add to the malfunction symptom menu, as well as to add new rules to the domain dependent rule base, thus allowing the expert system to be constantly improved and more reliable as new field data is gathered. It is conceivable that properly formatted, the information input by the elevator technician may be automatically used to modify the menu, and to make new rules in evidence-hypothesis format for the domain dependent rule base.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 7 is a flow chart of a program which implements a "symptom select routine" shown in block form in FIG. 4;

DESCRIPTION OF THE PREFERRED EMBODIMENTS

Figure 1:
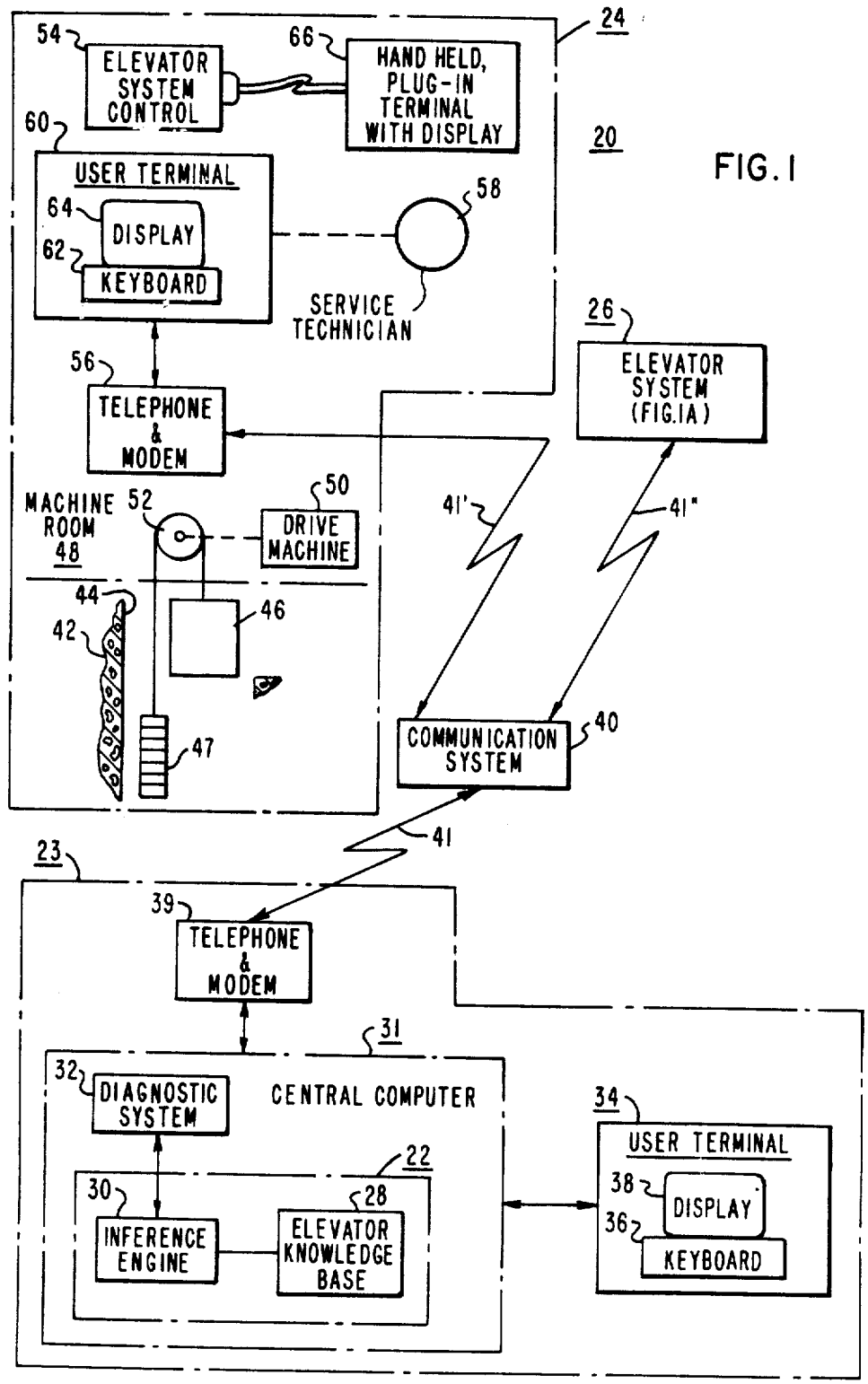
FIGS. 1 and 1A may be combined to provide a schematic diagram of the hardware involved in servicing a plurality of elevator systems utilizing a centralized expert system as a consultant, according to the methods of the invention.
Figure 1A:
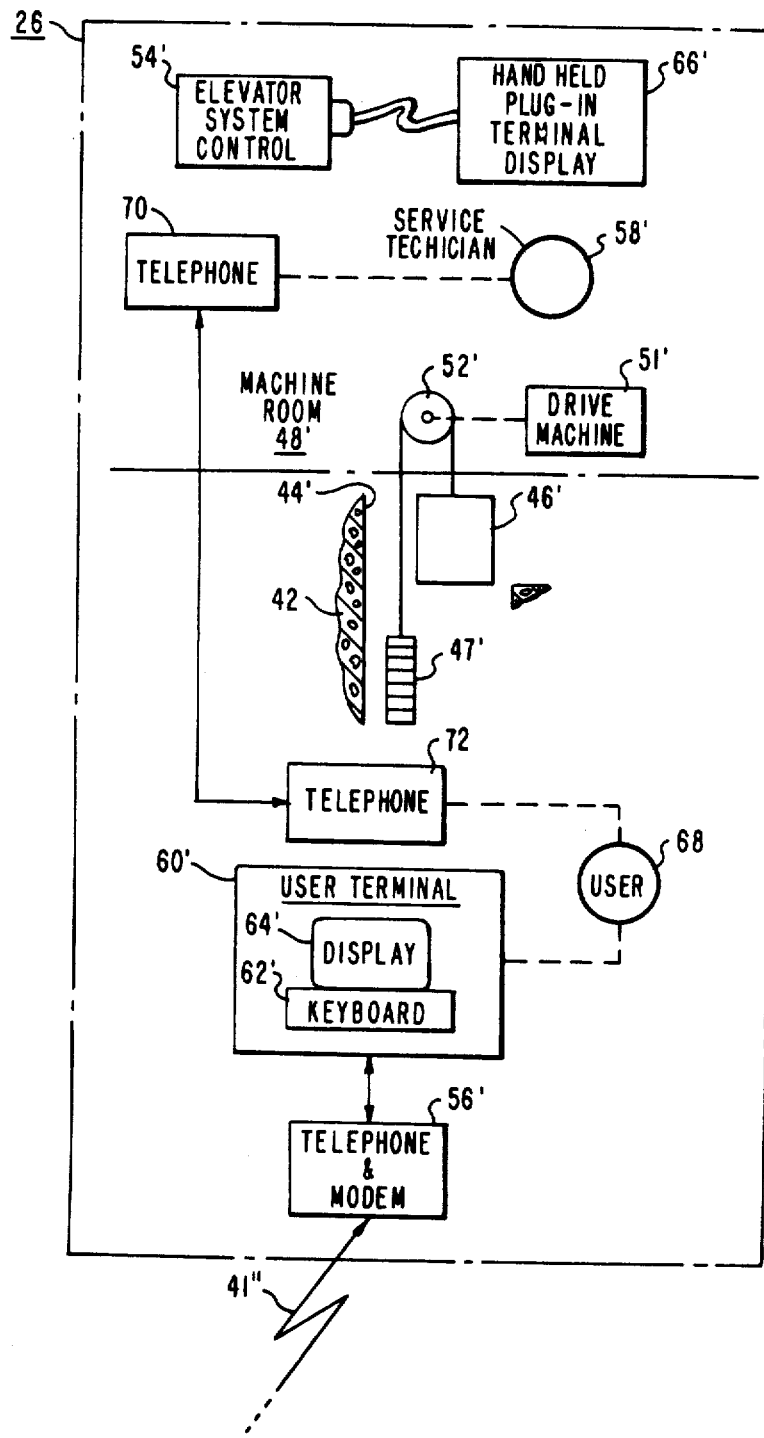

Referring now to the drawings, and to FIGS. 1 and 1A in particular, there is shown an elevator trouble shooting and servicing system 20 which may utilize the teachings of the invention. System 20 includes an expert system 22 located at a convenient, secure, central location 23, such as a manufacturing facility for elevator systems, and a plurality of remotely located elevator systems, such as elevator systems 24 and 26. Expert system 22 includes a knowledge base 28 of elevator trouble-shooting information and an inference engine 30, which may be the same as disclosed in the hereinbefore mentioned U.S. Pat. No. 4,649,515 and thus it need not be described in detail. Accordingly, U.S. Pat. No. 4,649,515 is incorporated into the present application by reference. In general, the knowledge base 28 includes a plurality of domain dependent rules formatted in evidence-hypothesis form by a knowledge engineer and one or more experts in the servicing of elevator systems. The inference engine 30 contains domain independent rules which control the selection and application of the domain dependent rules. The inference engine 30 builds a network of domain dependent rules which propagates belief in hypotheses to arrive at a probable cause of malfunction symptoms input to the system 22 by a user. The programs for the expert system 22 are resident in a central computer 31, which may be dedicated to the elevator servicing function, or which may be a large computer used to run a variety of other application programs.

Diagnostic system software 32, formulated according to the teachings of the invention, is also resident in the central computer 31, for integrating the expert system 22 into the working environment of an elevator service technician.

A user's terminal 34 may also be located at the centralized location 23, with terminal 34 having a keyboard 36 and a display 38. Terminal 34 may be plugged directly into the central computer 31.

The central location 23 also includes means, such as a telephone and modem 39, for communicating with the plurality of elevator systems via a communication system 40, such as a telephone communication system. Any other suitable communication means may be used, such as radio or microwave. Various communication links associated with communication means 40 are indicated generally at 41, 41' and 41".

Two elevator systems 24 and 26 are illustrated in FIGS. 1 and 1A, in order to set forth two different remote communication arrangements which may be used at the various elevator system sites. Elevator system 24 includes a building 42 having one or more hoistways 44 for accommodating one or more elevator cars 46 and their counterweights 47. Building 42 also includes a machine room 48 for the elevator drive machines 50, traction sheave 52, and elevator system control 54. Exemplary car controllers are illustrated in U.S. Pat. Nos. 3,750,850 and 3,804,209, U.S. Pat. No, 4,416,352 sets forth exemplary drive machine control, and U.S. Pat. Nos. 3,851,733 and 3,851,734 set forth suitable group supervisory control which may be used. These patents, which are all assigned to the same assignee as the present application, are hereby incorporated into the present application by reference.

Elevator system 24 further includes communication means, such as a telephone and modem 56 in the machine room 48. Thus, a service technician 58 may bring a user terminal 60 into the machine room 48, or one may be permanently installed in the machine room, as desired. Terminal 60 includes a keyboard 62 and display 64, which are connected to the telephone and modem 56.

The service technician 58 may take direct readings from various sensors and circuit points in the elevator system control 54. In certain solid state elevator control systems, the service technician 58 may have a portable, hand-held terminal 56 which plugs into the elevator system control 54 and gains access to the memory (RAM) of the control system. The service technician keys in a specific code for each block of elevator system signals desired to be read, and the display, for example, may provide eight binary signals in the form of a two digit hex number. The code and specific signals associated with each of the eight bit positions in the two digit hex number is also provided in the form of look-up tables in the central computer 31. Thus, when the expert system 22 desires predetermined evidence, i.e., sensor readings or signals for the domain dependent rules under consideration, system 22 will know when the service technician in using a terminal 66, and it will also know whether or not the required evidence is available via the use of terminal 66. When the evidence is available via terminal 66, system 22 will ask the service technician 58 to key in a predetermined code into the terminal 66. When the service technician receives the two digit hex number in response to the code, which appears on the read out or display of terminal 66, he will then enter the hex number into the keyboard 62. When terminal 66 is not being used, or when the desired evidence is not available via terminal 66, system 22 will specifically describe the sensor data to be obtained. In the following description, evidence taken directly by the service technician will be referred to as evidence from a sensor, and evidence taken indirectly via terminal 66 will be referred to as evidence from buffered sensors.

Elevator system 66, where similar to elevator system 24, utilizes like reference numerals except with the addition of a prime mark, and these like elements will not be described again. The difference between elevator systems 24 and 26 lies in the fact that in system 26 the user terminal 60' is not available for use directly in the machine room 48'. Thus, the service technician 58 communicates with a user 68, such as via telephones 70 and 72, respectively, located in the machine room 48' and at the location of terminal 60'. User 68 relays questions and suggestions from display 64' to the service technician 58', and the service technician 58' obtains the requested sensor evidence, or tries the suggested test procedures, and informs the user 68, who then keys an appropriate response into keyboard 62'.

Figure 2:
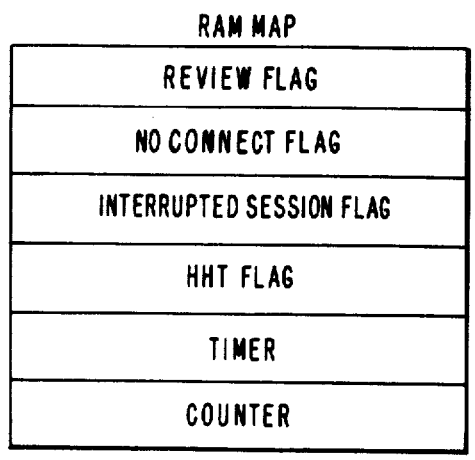
FIG. 2 is a RAM map of timers, flags and program variables which will be used in the description of the program flow charts shown in FIGS. 4–11.
Figure 3:
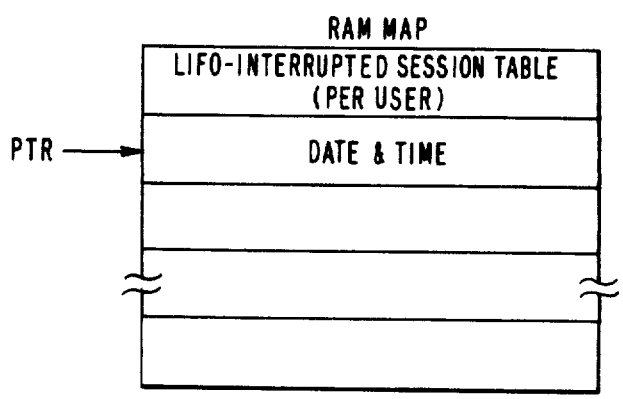
FIG. 3 is a RAM map of an interrupted session table maintained for each authorized user, which table is referred to in certain of the program flow charts of FIGS. 4–11.

FIGS. 2 and 3 are RAM maps which set forth program variable and tables utilized in the programs set forth in FIGS. 4-11. The programs of FIGS. 4-11, set forth in detailed flow charts, implement the diagnostic system software 32 shown in FIG. 1, and they integrate the expert system 22 into the work environment of the elevator service technician. This integration is accomplished such that a technician with little experience with computers may easily interact with the knowledge base, without any compromise of security.

The letters in parenthesis in the function blocks of FIGS. 4-11, indicate whose action is involved in the block. A "(U)" indicates the user of the remote terminal, a "(T)" indicates the remote terminal and a "(C)" indicates the central computer.

Figure 4:
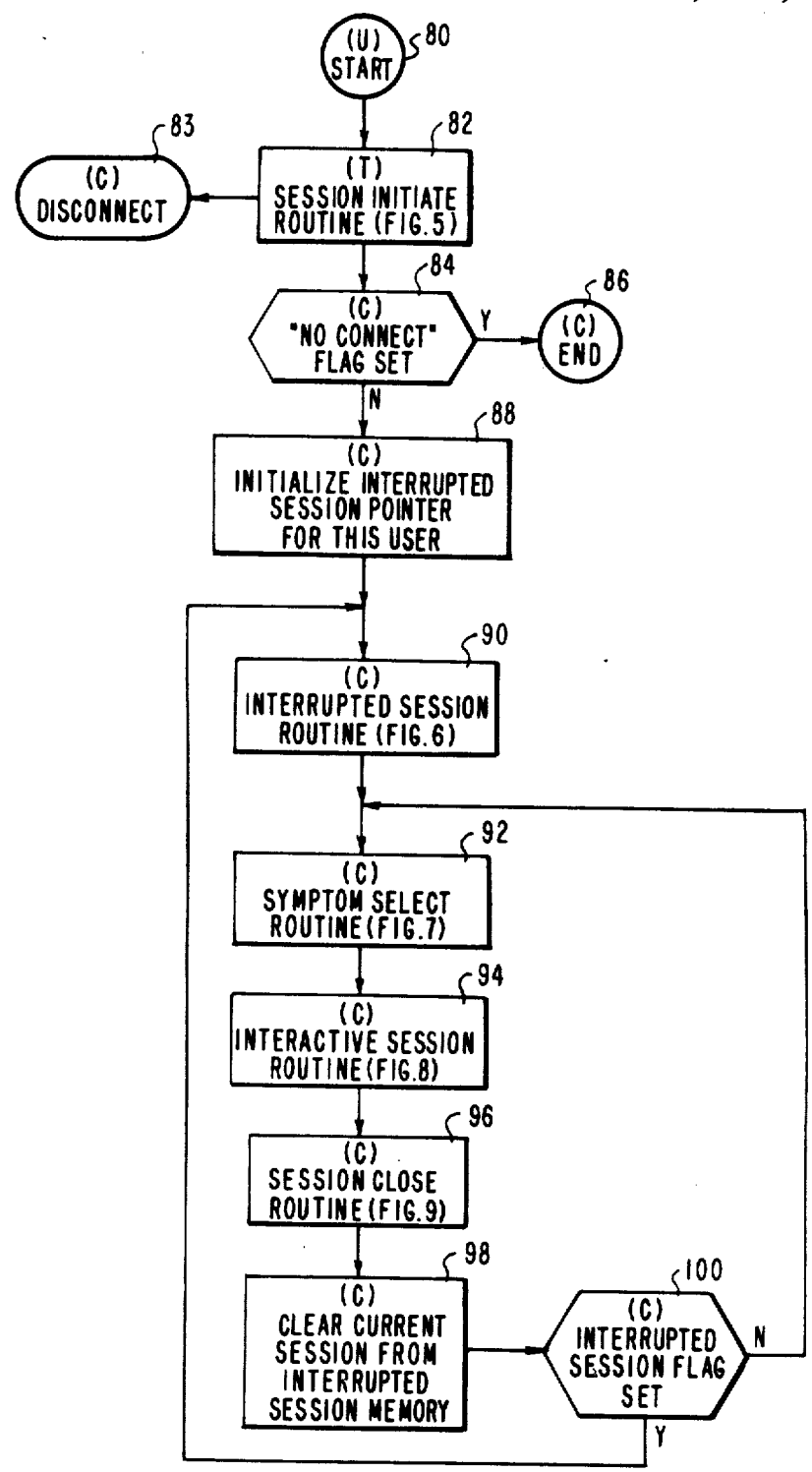
FIG. 4 is a block diagram which broadly sets forth the teachings of the invention.

FIG. 4 is a functional block diagram of the diagnostic system 32 shown in FIG. 1, which starts at terminal 80 and enters function 82 which is entitled "Session Initiate Routine". Function 82 attempts to establish a user initiated communication link with the central computer 31, and, as will be hereinafter described, it does so without requiring specialized knowledge or training on behalf of the user. Block 82 also performs the vital security functions which permit only authorized access to the expert system by authorized users. If the user is not authorized, function 82 disconnects and terminates the user initiated communication link, as indicated at 83.

If the central computer 31 recognizes an authorized user, it breaks the user initiated communication link and then attempts to call back to try to establish a computer initiated communication link with the proper building and user. If the central computer 31 is unable to establish a communication link with the user at this time, it will set a flag "no connect" shown in the RAM map of FIG. 2, and step 84 checks the state of this flag. If this flag is set, step 84 terminates the communication, indicated at 86.

If step 84 finds the no-connect flag is not set, step 88 initializes a pointer PTR to an interrupted session table for the identified user, such as the table shown in the RAM map of FIG. 3. The centralized computer stores each session in memory, until the session has been completed. Thus, when a session for a user is not completed, for some reason, the central computer 31 already has the results of the session in memory and it makes an entry into the interrupted session table for the specific user. The table, which is a LIFO table, includes a listing of each interrupted session for this user, by date and time-of-day. Function 90 then checks pointer PTR to determine if there is an interrupted session of this user. Function 90 then also gives the user the opportunity of reestablishing any such session, stepping through the interrupted sessions, when there is more than one, starting from the most recent. Function 90 also gives the user the opportunity of starting from where the prior session ended, and the opportunity to review the session, including the change to change prior evidence which was input during the session before it was interrupted.

The interrupted session routine at block 90 then proceeds to a symptom select routine in block 92. If this is not an interrupted session, function 92 displays a menu of elevator malfunction symptoms for the user to make a selection. An expansion of the user selection, through appropriate sub-menus, may also be made after the initial selection, if more specific information is required by the expert system.

Function 94 then performs an interactive session with the user, in which the expert system asks the user for specific information or evidence, as required by the evidence-hypothesis format of the knowledge based rules, until a possible cause of the malfunction symptom is identified. The expert system will display the possible cause, the confidence factor in the belief that this is the cause, as well as a suggested corrective action. If the information provided by the expert system does not solve the problem, the session continues until either the problem is solved or the user decides to terminate the session. If the user decides to terminate the session, a session close routine, shown in block 96, is performed. During the function of block 96, information is provided by the user to the central computer on the success of the session and this function gives the user the opportunity to input information relative to the actual cause of the problem, and the trouble-shooting steps utilized to solve the problem, when the session was not successful. This information is then used by a knowledge engineer to update the system menu and rule base.

Step 98 then clears the current session from memory, since, upon reaching this point, the session has been completed. The entry into the interrupted session table for this particular user will also be purged.

Step 100 checks to see if the session which has just been completed has been previously interrupted, such as by checking a flag "interrupted session". Such a flag may be set when the session is the completion of an interrupted session. If the interrupted session flag is set, then there may be other interrupted sessions that this same user may which to resume, so the program returns to function 90. If the interrupted service flag is not set, the program returns to step 92 to give the user the opportunity to input a symptom of still another problem, or to give the user the opportunity to terminate the session. The program continues as hereinbefore described, until the user selects "exit", which is included with the list of symptoms in the symptom menu of function 92.

Figure 5:
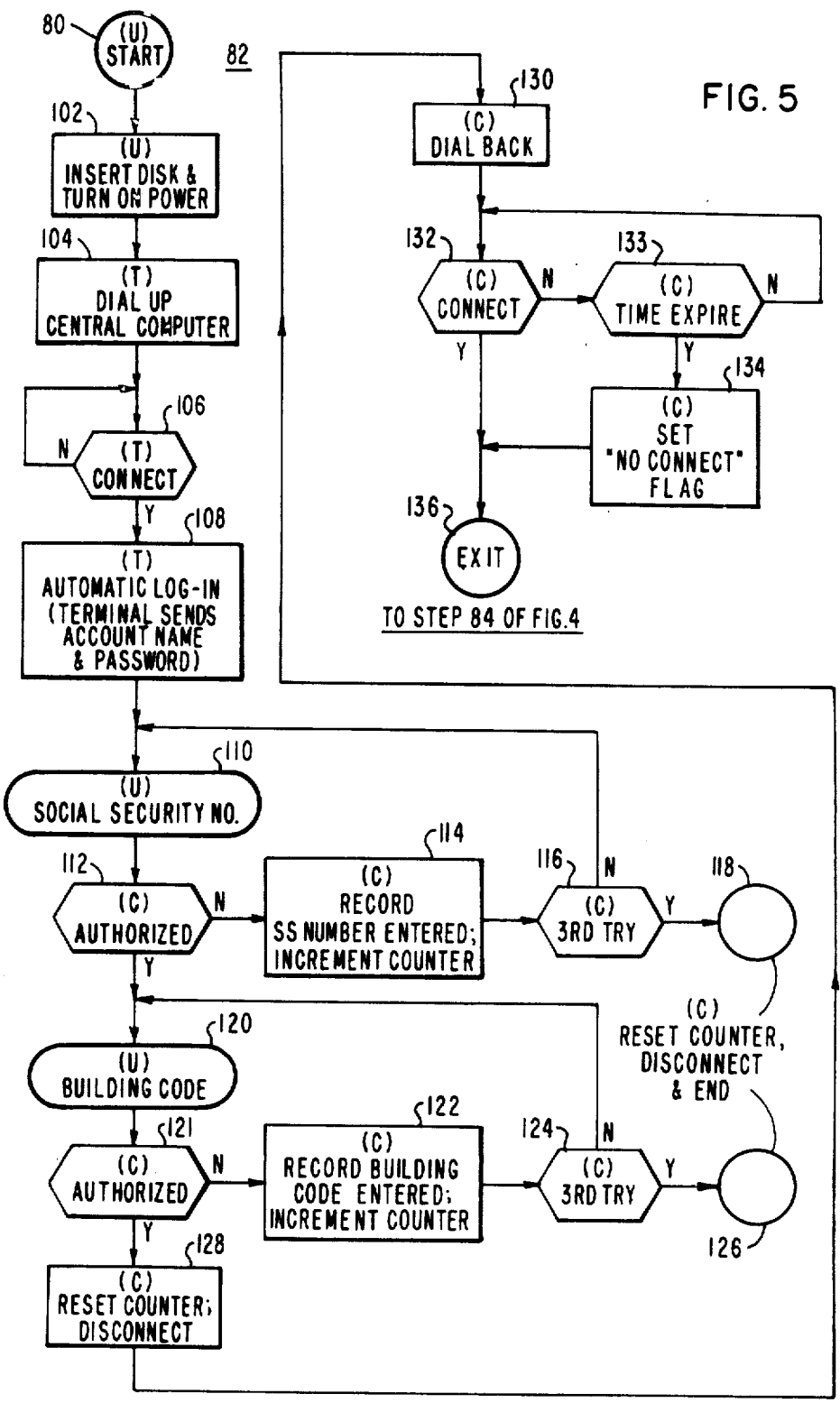
FIG. 5 is a flow chart of a program which implements a "session initiate routine" shown in block form in FIG. 4.

FIG. 5 is a flow chart which may be used to implement the session initiate function 82 shown in FIG. 4. Routine 82 is entered at input 80, the same as shown in FIG. 4, and step 102 merely requires that the user insert the application disc into the terminal 60 and turn on the electrical power. Step 104, which is performed by the terminal 60, automatically dials the central computer 31. Step 106, performed by terminal 60, checks to see if a connection has been made with the central computer. If not, the program continually loops through step 106, until either a user initiated communication link is established with the central computer, or the user desires to terminate the attempt to establish the communication link.

If step 106 finds that a connection has been made with the central computer, step 108 performs an automatic log-in function, which includes the terminal sending an account name and a password. The account name identifies that the user wishes to access the expert system for elevator trouble-shooting. The account name is necessary when a large computer is involved, which may have many different application programs to run. The password is built into the disc, and identifies the disc as an authentic disc for establishing a communcation link with the central computer.

Step 110 then requires the user to key in a personal code or password, known only to him. For example, the personal password may be the user's Social Security Number. Upon receipt of the personal password, the central computer, the step 112, checks to see if this password is associated with an authorized user. If it is not, step 114 records the number entered and increments a counter, such as the software counter shown in the RAM map of FIG. 2. Step 116 checks to see if the count has reached a predetermined value, such as three. If it has not reached the predetermined count value, the program returns to step 110 in order to give the user the opportunity of entering a correct personal code. If the count of such attempts reaches the predetermined value, step 116 branches to step 118 which resets the counter and disconnects the commuication link. The record of incorrect numbers stored in step 114 is available for use by authorized personnel, should they desire to investigate the unsuccessful attempt to utilize the expert system.

When step 112 finds that the personal code is an authorized code, the central computer then resets the counter and advances to a portion of the program concerned with a code previously assigned to the building. The central computer asks the user to enter the building code, and step 120 indicates the entering of the building code by the user. Step 121 checks to see if this code is an authorized code. If it is not an authorized code, step 122 records the building code actually entered and the counter shown in the RAM map of FIG. 2 is incremented. Step 124 checks to see how many unsuccessful attempts at entering the building code have been made, and if the number reaches a predetermined value, such as three, the computer, in step 126, resets the counter and disconnects the communication link with the accessing terminal. If step 124 finds that the maximum number of attempts has not been reached, the program returns to step 120, to enable the user to enter the proper building code.

If step 121 finds that the authorized building code has been entered, step 128 resets the counter and disconnects the user initiated communication link. The central computer then accesses a look-up table, using the building code, to obtain the telephone number of the machine room associated with the identified building. Step 130 also includes the function of dialing the telephone number found in the look-up table. Step 132 checks to see if a connection has been made, and if it finds that no connection has been made, step 133 checks to see if a predetermined period of time has expired since step 130 dialed the telephone number. Step 130, for example, may start a software timer, such as the timer shown in the RAM map of FIG. 2. The program loops through steps 132 and 133 until step 133 finds that the time has expired, which results in the computer setting the "no-connect" flag, as indicated in 134, or until step 132 finds that a connection has been made. When step 132 finds that a connection has been made, the program advances to step 84 at terminal 136.

As shown in FIG. 4, step 84 checks the "no-connect" flag shown in the RAM map of FIG. 2, and if this flag was set in step 134 of FIG. 5, the computer ends the attempted session at 86. If step 84 shown in FIG. 4 finds that the "no-connect" flag has not been set, step 88 initializes the pointer PTR to the interrupted session table for the specific identified user, and the program advances to function 90.

Figure 6:
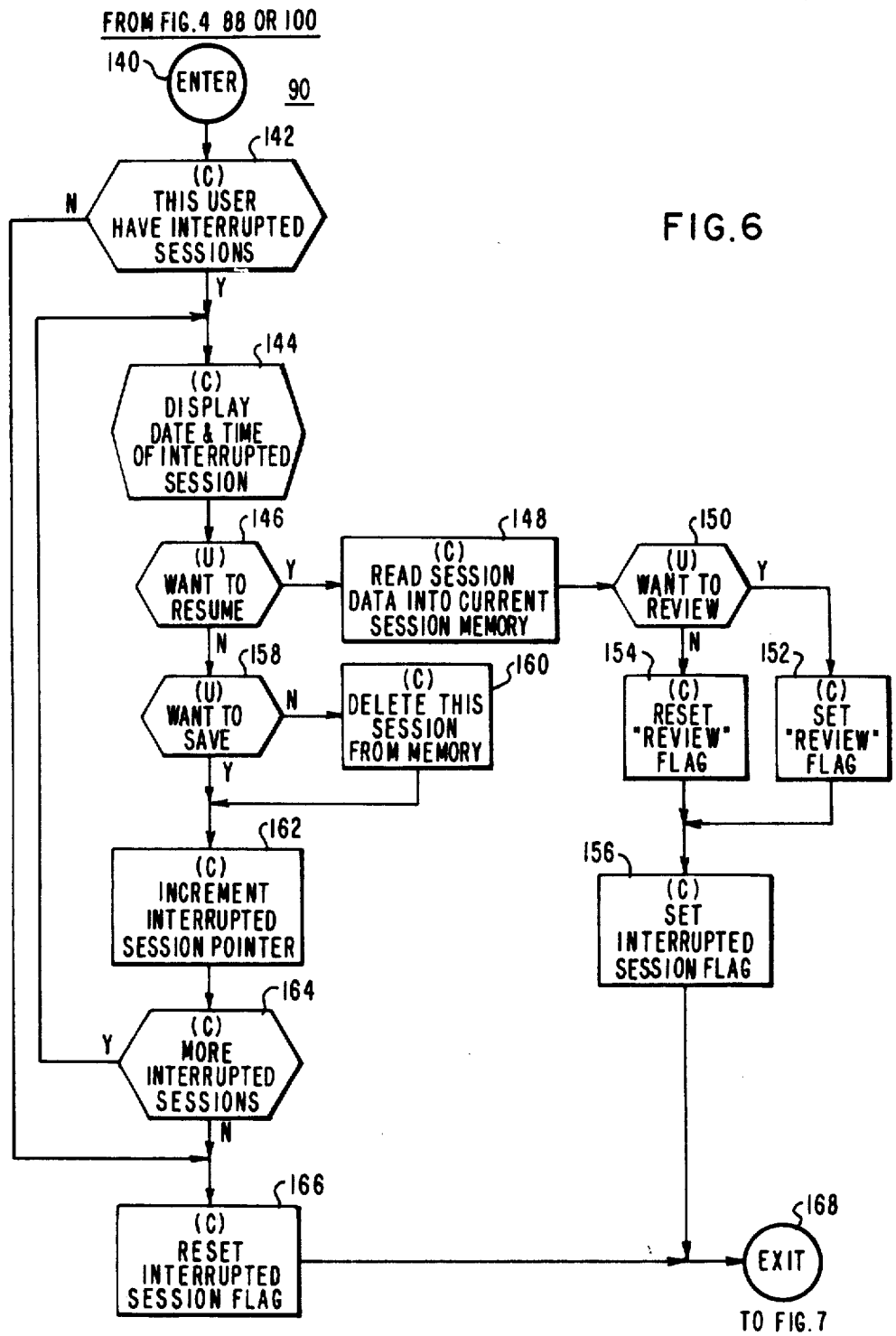
FIG. 6 is a flow chart of a program which implements an "interrupted session routine" shown in block form in FIG. 4.

FIG. 6 is a flow chart which may be used to implement function 90, which is entitled "interrupted session routine". This routine is entered at 140 and step 142 checks to see if there are any interrupted sessions for the identified user. This is determined simply by checking the pointer PTR to the user's interrupted session table. If there is no entry at the initialized position of pointer PTR, there are no interrupted sessions and the program advances to step 166, which resets the interrupted session flag shown in the RAM map of FIG. 2, and the routine exits at 168, which proceeds to function 92.

When step 142 finds an entry at the location of the pointer PTR, there is at least one interrupted session and the central computer displays the date and time of the interrupted session on the display of the user terminal 60. This is indicated in block 144 of FIG. 6. The central computer then asks the user, in block 146, if he wishes to resume the interrupted session displayed. If the user wishes to resume this session he indicates the desire by an appropriate entry on the keyboard 62, and the central computer, in block 148 reads the session data of the interrupted session into the current session memory. The central computer then asks the user if he wants to review what has occurred in the interrupted session, as indicated in block 150. If the user wishes to review this information, such as to refresh his memory or to give him the opportunity of changing prior entries such as due to errors or due to the age of the data, the user indicates an affirmative answer on the keyboard 62. The central computer then sets a review flag, shown in the RAM map of FIG. 2, as indicated in step 152. The review flag will be checked in a sensor check routine shown in FIG. 10, which will be hereinafter described.

If step 150 finds the user does not wish to review the interrupted session, step 154 resets the review flag and step 156 sets an interrupted session flag, shown in FIG. 2, in order to let subsequent routines known that this session is the continuation of an interrupted session. After the interrupted session flag is set in step 156, the program advances to function 92, as indicated at terminal 168.

Should step 146 find that the user does not wish to resume the interrupted session displayed, step 158 asks the user if he wishes to save the interrupted session displayed. If the user gives a negative reply, step 160 deletes that specific session from the memory. If step 158 finds the user wishes to save the displayed interrupted session, step 162 increments the pointer PTR to the interrupted session table. Step 164 then checks to see if there are any more interrupted sessions. If there are, established by the pointer PTR pointing to a non-zero entry, the program returns to step 144. If step 164 finds there are no more interrupted sessions, step 166 resets the interrupted session flag to indicate that the current session is not the continuation of an interrupted session. The program then advances to function 92, as indicated at terminal 168.

A flow chart which implements the symbol select routine of function 92 is set forth in FIG. 7. This routine is entered at terminal 170 and step 172 checks to see if the interrupted session flag is set. If it is set, indicating the current session is the continuation of an interrupted session, step 174 reads the malfunction symptom which was previously selected and stored in memory. Step 175 loads the context of the selected symptom. Step 176 then asks the user if he has a hand held terminal 66. If he does, step 178 sets flag HHT, shown in the RAM map of FIG. 2, to indicate that the user has a hand held terminal, and the program advances to function 94 from exit terminal 180. If step 176 finds that the user does not have a hand-held terminal, step 178 is bypassed, with the routine exiting at terminal 180.

If step 172 finds that the interrupted session flag is not set, indicating that the current session is not the continuation of an interrupted session, step 182 retrieves the main malfunction symptom menu from memory, and step 184 displays the symptom menu for the user on display 64. Table I sets forth an exemplary main menu. The user makes a selection, indicated at step 186, and the central computer checks the selection to see if a sub-menu is required, in step 188. Some symptoms displayed in the main menu may be broad categories of malfunction symptoms, requiring a more detailed selection. When a sub-menu is required, step 190 obtains the appropriate sub-menu, and returns to step 184 to display the menu just obtained.

TABLE I

SYMPTOMS

1. Hand held terminal will not log on
2. Car will not run and car is at floor level
3. Car will not run and car is not at floor level
4. Car dynamics
5. Car calls
6. Corridor calls
7. System processor not running
8. Car on block operation
9. Other message
10. Log of last session
11. Exit When step 188 finds that all menu requirements have been satisfied, step 192 checks to see if the user selected "EXIT" from the menu. As will be hereinafter described, this is the normal way for the user to terminate a session. If the user had selected "EXIT" from the menu, the central computer disconnects the communication link, indicated at 194.

If step 192 finds that the user does not wish to terminate the session, step 196 checks to see if the user selected "log display". If the user selected "log display", the log of the last completed session is scrolled on the user's display 64, as indicated in block 198. Block 198 then returns to step 182.

Figure 9:
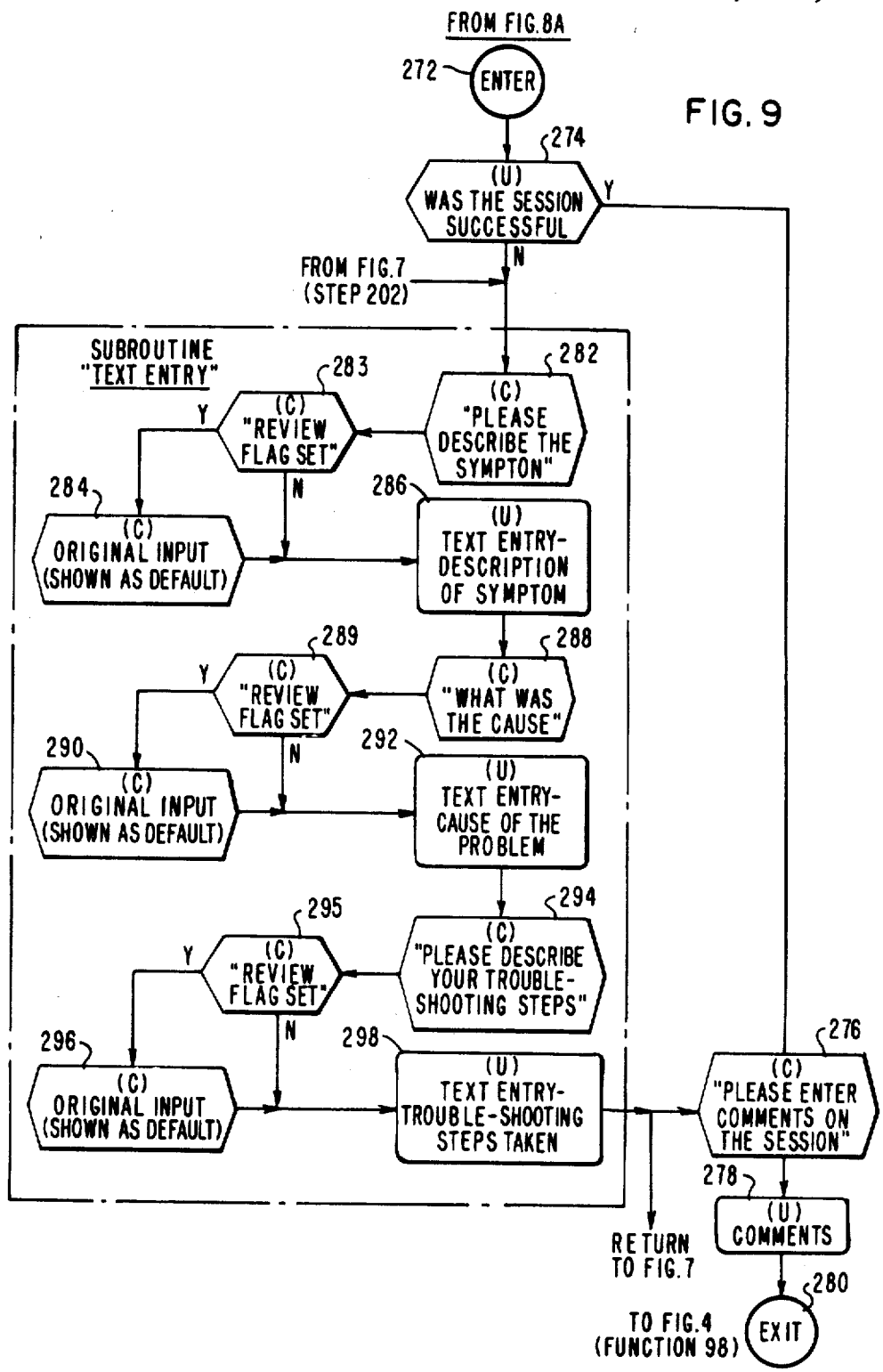
FIG. 9 is a flow chart of a program which implements a "session close routine" shown in block form in FIG. 4.

If step 196 finds that the user did not select "log display", step 200 checks to see if the user selected "other". The user selects "other", when the malfunction symptom he has identified in the elevator system is not shown in the menu. When "other" is selected by the user, step 202 calls a text entry sub-routine shown in FIG. 9. The text entry sub-routine provides the user with the opportunity of inputting a malfunction symptom, a description of the symptom, the cause of the symptom and the trouble-shooting steps which the user utilized in order to solve the problem. This subroutine will be described in detail when FIG. 9 is described. When the text entry subroutine returns to step 202, the program returns to step 182.

When step 200 finds that the user has not selected "other", the program advances to step 175, previously described, to load the context of the selected symptom. The symptom select routine 92 then checks for the hand-held terminal in steps 176 and 178 and terminates at terminal 180, advancing to function 94.

Figure 8A:
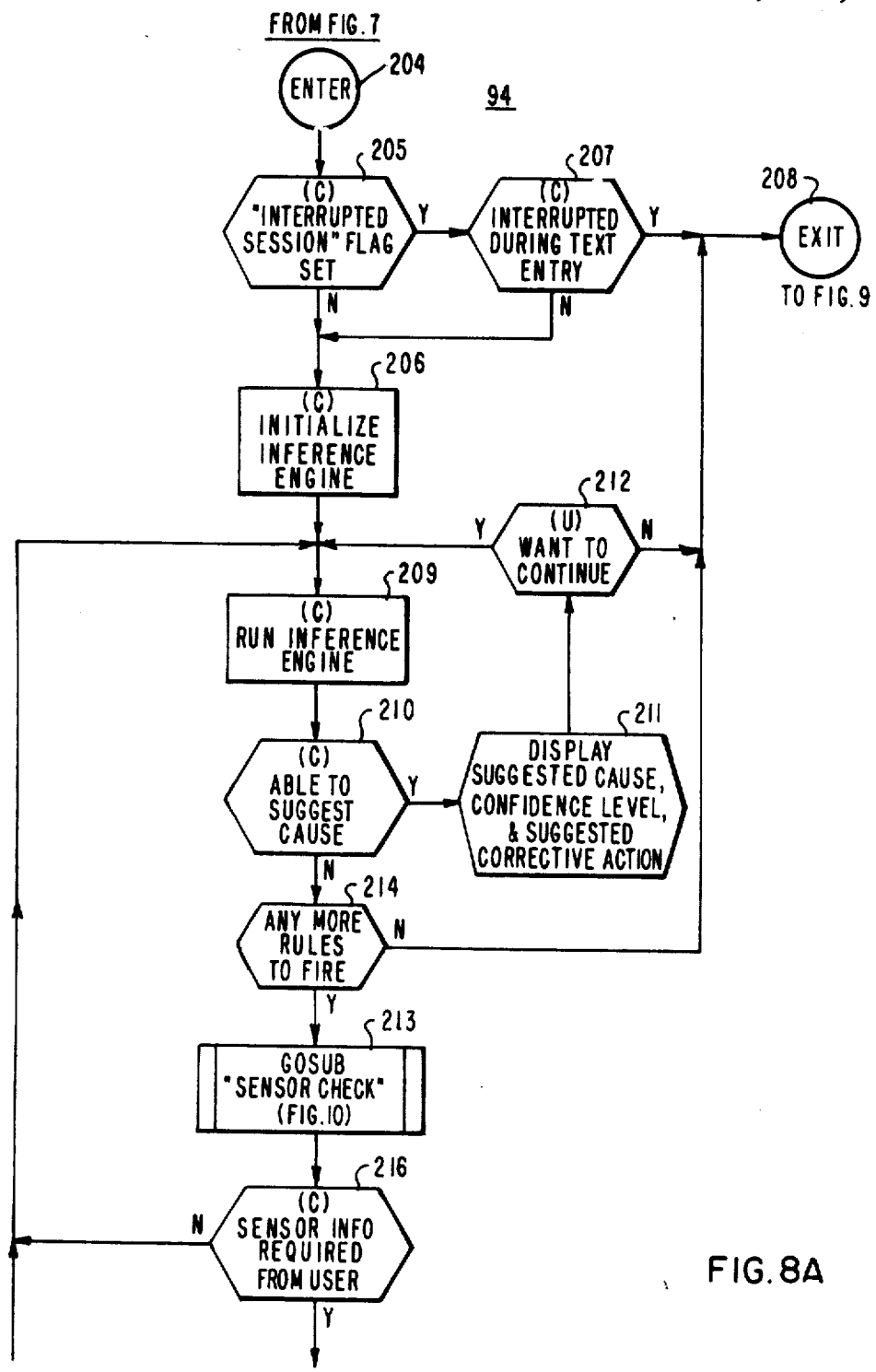
FIGS. 8A and 8B may be combined to provide a flow chart of a program which implements an "interactive session routine" shown in block form in FIG. 4.
Figure 8B:
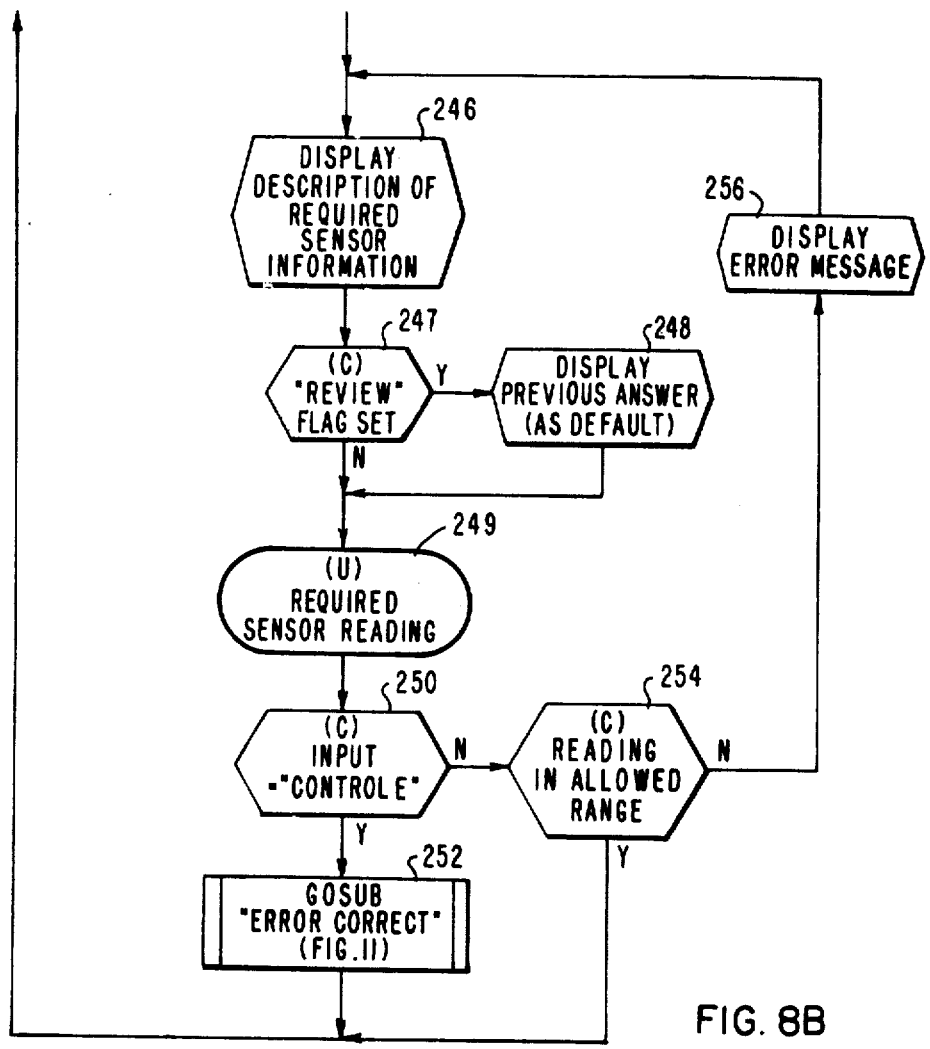
Figure 10:
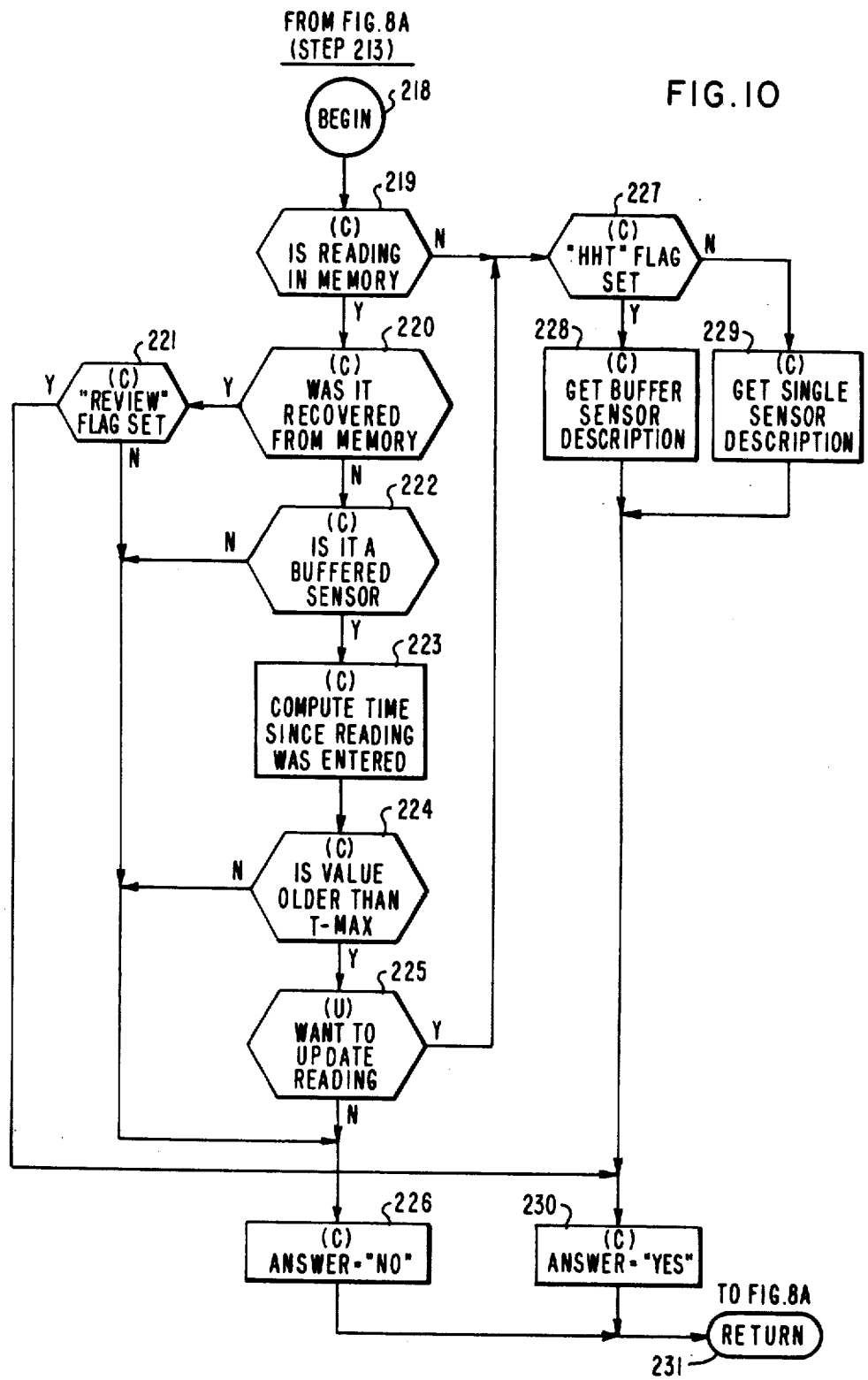
FIG. 10 is a flow chart of a program which expands upon a method step of the interactive session routine shown in FIG. 8.

A flow chart implementing function 94, which is entitled "interactive session routine", is set forth in FIGS. 8A and 8B. This routine is entered at terminal 204, and step 205 checks the interrupted session flag to determine if the present session is the continuation of an interrupted session. If it is not an interrupted session, step 206 initializes the inference engine 30 shown in FIG. 1. If the interrupted session flag is found to be set in step 205, step 207 determines if the session was interrupted during the entry of text by the user. If the session was interrupted at the text entry stage, it is not necessary to run the interactive session routine, and the program exits at 208. If the session was not interrupted during text entry, step 207 proceeds to step 206, which initializes the inference engine. Step 209 then runs the inference engine 30 shown in FIG. 1, in order to select a rule from the domain dependent rule base 28. Step 210 checks to see if the inference engine is able to suggest a cause of the symptom selected from the symptom menu in the symptom select routine. If the inference engine is not able to suggest a cause, the program, in step 214, makes sure it has not reached a point where it has run out of rules to fire. If there are rules to fire, a subroutine "sensor check" shown in FIG. 10 is called. This subroutine provides the answer for step 216 which checks the results of the subroutine to see if sensor information is required from the user. For example, when the inference engine selects a rule, the rule will be in evidence-hypothesis form, and it probably will not have the evidence required by the rule. Thus, step 210 will usually advance to step 216 in the initial stages of the interactive session with "yet" as the answer. If step 214 finds there are no more rules to fire, it proceeds to exit 208.

Referring to FIG. 10, the subroutine "sensor check" starts at terminal 218 and step 219 checks to see if the reading or sensor information required is already in the memory of the central computer. If it is not, information is required from the user, and the program proceeds to step 227. If step 219 finds that the reading is already in memory, step 220 checks to see that this information was read in from an interrupted session memory. If it was read in from an interrupted session memory, step 221 checks to see if the review flag has been set. It will be recalled that the review flag is set in step 152 of FIG. 6, when the user wishes to review an interrupted session. If step 221 finds that the review flag is not set, the program advances to block 226 which prepares a "no" answer to the question "is sensor information required from the user," and the subroutine returns to step 216 in FIG. 8A from exit 231. If step 221 finds that the review flag is set, step 221 advances to block 230 which prepares a "yes" answer to the question posed in step 216, and the subroutine returns to step 216 at 231.

If step 220 finds that the information was not read in from an interrupted session memory, step 222 checks to see if the information is from a buffered sensor. It will be recalled that information provided by the hand-held terminal is referred to as information from a buffered sensor. If the information is not from a buffered sensor, the program goes to the "no" block 226. If the information is from a buffered sensor, step 223 computes the time since the reading was entered. When a reading from the buffered sensor is stored, the date and time of day is also stored, so that step 223 can compute the elapsed time since the reading was entered. Step 224 compares the age of the reading with a predetermined value T-MAX. Typical value is 30 minutes, for example. If the reading is not older than T-MAX the program returns to the "no" block 226. If the information is older than T-MAX, step 225 asks the user if he wishes to update the reading. If the reply is in the affirmative, the program goes to step 227, and if he replies in the negative, the program goes to the "no" block 226.

Step 227 checks the HHT flag to determine the terms which should be used to describe the required sensor. If flag HHT is set, step 228 obtains the code which when input to the hand-held terminal 66 will provide the required data. If flag HHT is not set, step 229 obtains the description of the single sensor involved. Step 228 and 229 both proceed to the "yes" block 230.

Returning to FIG. 8A, when step 216 finds that sensor information is required from the user, step 246 in FIG. 8B displays the description of the required sensor information, which was obtained in step 228 or step 229 of FIG. 10. Steps 247 and 248 cooperate to display the previous answer as a default, when step 247 finds the "review" flag set. If step 228 obtained the description, step 246 displays the code which the user should enter into the hand-held terminal 66 in order to obtain the proper signal or sensor information. The user then enters this code into the hand-held terminal 66, and upon obtaining the two-digit hex number, the user enters the two-digit hex number into the keyboard 62, as indicated at 249. The central computer stores the time of day that this information was input into the system, and step 249 advances to a step 250.

If step 229 of FIG. 10 obtained the sensor description, the central computer provides a detailed description of the required sensor information in step 246, and it will also list a default value, if one is available, as determined by steps 247 and 248. The user either actuates "return", if the default value is correct, or he enters the required sensor reading, as indicated in step 249. Step 249 then advances to step 250.

In step 250, the computer checks to see if the user wishes to correct an error in the entry of the information. When the user makes a mistake in the entry, he actuates a control input "E", and step 252 calls an error correction sub-routine shown in FIG. 11. If step 250 finds that control "E" has not been entered by the user, step 254 checks the sensor reading which has been entered to see if it is in an allowable range for this sensor. If it is, the program has the information it requires and it returns to step 207 to run the inference engine. Should step 254 find that the reading is not in an allowed range for the sensor in question, the computer transmits an error message to the user, indicated in step 256, and the program returns to step 238. The user now has an opportunity to enter another reading, in an attempt to obtain correct information.

Figure 11:
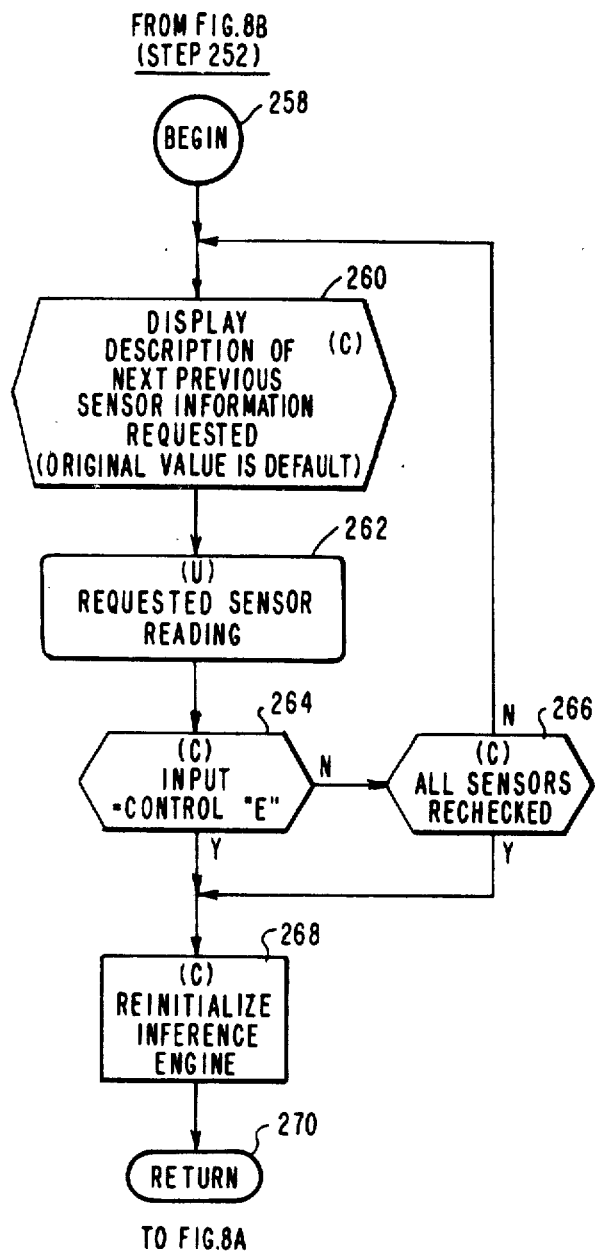
FIG. 11 is a flow chart of an error correction subroutine which may be called by the interactive session routine shown in FIG. 8.

FIG. 11 is a flow chart of an error correction sub-routine which may be used to implement block 252 shown in FIG. 8B. The error correction sub-routine is entered at terminal 258 and the central computer steps back through the requested sensor information and the input data, starting with the most recent question and associated data received. Thus, step 260 describes the next previous sensor information requested, and step 260 displays the requested sensor reading provided by the user. If the reading is correct, the user hits the return key and the original value, which is the default value, is retained. If the value shown in step 262 is not correct, instead of hitting return, the user enters the correct value. Step 264 then checks to see if the user has again actuated control "E". Actuating key "E" while in the error correction subroutine, will break the program out of the correction loop, and step 268 reinitializes the inference engine. If step 264 finds that the control key "E" has not been actuated, step 266 determines if all of the sensors have been rechecked. If they have not, step 266 returns to 260 to display the next previous sensor information. When step 266 finds that all sensors have been rechecked, the program advances to step 268 which reinitializes the inference engine. The error correction subroutine then returns to step 252, at terminal 270.

The interactive session routine shown in FIGS. 8A and 8B then continues, with the inference engine selecting rule after rule in order to traverse the rule network to propagate belief until a suggested cause of the malfunction is isolated. Each time a suggested cause is set forth in step 210, the user checks to see if this solves the problem, and he indicates whether or not he wishes to continue in step 212. If the problem has not been solved, step 212 will return to step 209. When the problem is solved, the user indicates that he does not wish to continue in step 212, and the interactive session routine advances to function 96 in FIG. 4, as indicated at terminal 208.

Function 96, entitled "Session Close Routine", is set forth in detail in a flowchart in FIG. 9. This routine is entered at terminal 272, and step 274 asks the user if the session was successful. If the user indicates an affirmative answer, step 276 asks the user to enter comments on the session. Step 278 indicates the entry of the user's comments, and when the user completes his comments, a control key is actuated, to indicate completion of the ments, and the program advances to step 98 in FIG. 4, as indicated at exit terminal 280.

when step 274 is answered in the negative, the subroutine "text entry" is entered. This subroutine was mentioned in connection with step 202 of FIG. 7. The first step of the subroutine, indicated at 282, asks the user to describe the symptom. Steps 283 and 284 indicate that the original input is also displayed as a default value when the review flag is set. Step 286 indicates the text entry of the symptom, and the user actuates a control key when the description has been completed. The program then asks the user the cause of the symptom, displaying the original input as a default value when the review flag is set, as indicated at steps 288, 289 and 290. The user then types in the cause of the problem, indicated at 292, and actuates a control key when the cause of the problem has been completely entered. The computer then asks the user, in step 294, to describe the trouble-shooting steps which he utilized to solve the problem. Steps 295 and 296 indicate that the original inputs are displayed when the review flag is set. The user then enters the trouble-shooting steps taken, indicated at 298, and actuates the appropriate control key to signal the end of the text entry. The subroutine ends after step 298, and returns to step 202 of FIG. 7, if the subroutine was called by the symptom select routine of FIG. 7. Otherwise, step 298 goes to step 276, hereinbefore described. When the session close routine terminates at exit terminal 280, the program advances to step 98 shown in FIG. 4, which clears the current session from the interrupted session memory, since this session has been completed, and step 100 returns the program to step 90 or step 92, according to the condition of the interrupted session flag, as hereinbefore described. When the program of FIG. 4 reaches the symptom select routine of FIG. 7, and the user selects "EXIT" from the symptom menu, the session is ended at the disconnect indicated at 194 in FIG. 7.

In summary, there has been disclosed new and improved methods of integrating an expert system having a knowledge base of elevator trouble-shooting rules, into the working environment of the average elevator service technician. The method enables any number of previously authorized elevator service technicians to directly access the expert system from the location of the elevator system being services, and the expert system will provide a guided path for the technician which is easily followed without extensive prior training of the technician. Further, such direct access of the expert system is only permitted after a review procedure which screens unauthorized users from the system. Finally, the methods provide information for a knowledge engineer which enables the expert system to be constantly improved, by more accurately diagnosing malfunction symptoms, and by adding new symptoms to the menu, along with appropriate new rules, as new symptoms are encountered.

We claim as our invention:

1. A method in which an expert system having a knowledge base of elevator trouble-shooting information may be used interactively, as a consultant, by any number of remotely located elevator service personnel without requiring special training in the use of expert systems, and without compromising the security of the knowledge base, comprising the steps of:
   providing a knowledge base of elevator trouble-shooting information, including a rule network having rules in evidence-hypothesis format,
   enabling contact to be made with said knowledge base from any number of remote elevator system locations via communication means,
   limiting access to said knowledge base to authorized users,
   establishing a communication link between an authorized user located at a remote elevator system and the knowledge base via the communication means,
   initiating an interactive exchange session between the user and knowledge base via the communication link,
   said interactive session including the steps of:
   displaying an elevator system malfunction menu, selecting a symptom from the menu, and running an inference engine using the selected symptom to traverse the rule network,
   asking the user to provide evidence unavailable to the knowledge base which is required to propagate belief through the rule network in an effort to determine a probable cause of the selected symptom,
   said asking step including the step of providing the user with a specific code related to the evidence required by the knowledge base,
   accessing the elevator system for evidence via a programmable terminal,
   said accessing step including the step of entering the specific code provided to the user by the knowledge base,
   said accessing step further including the step of obtaining a plurality of evidence bits from the elevator system in response to the coded entry, some of which may be immediately utilized by the knowledge base to propagate belief through the rule network and some of which may be subsequently utilized during subsequent belief propagations through the rule network,
   computing the age of each of such bit of evidence before it is used by the knowledge base,
   comparing the computed age with a predetermined value,
   and asking the user if the evidence should be updated when the age exceeds the predetermined value.

2. The method of claim 1 including the step of outputting a probable cause of the selected symptom, the confidence level of the diagnosis, and suggested corrective action.

3. The method of claim 1 including the step of keeping a record of the interactive exchange session between the user and knowledge base, notwithstanding interrupted communications between the user and the knowledge base, enabling the session to be reinitiated without the necessity of repeating prior steps associated with entry of evidence.

4. The method of claim 3 including the step of displaying the stored record for user review upon command by the user.

5. The method of claim 4 including the step of providing an opportunity for the user to change previously input evidence in the stored record.

6. The method of claim 3 including the step of keeping a record of interrupted sessions for each authorized user, stepping through the interrupted sessions for an identified user, when there is more than one, and providing an opportunity for the user to select an interrupted session to be resumed.

7. The of claim 1 including the step of keeping a record of the interactive exchange session, initiating an error mode when the user wishes to change evidence previously input, stepping back through the previously input evidence in response to the user initiated user error mode, and enabling the user to change previously input evidence.

* * * * *